United States Patent [19]

Ankum et al.

[11] Patent Number: 4,793,511

[45] Date of Patent: Dec. 27, 1988

[54] SEED METER HAVING SEED DISK APERTURE CLEANING WIPER AND BRUSH ARRANGEMENT

[75] Inventors: Robert H. Ankum, Davenport, Iowa; Jay H. Olson, Rock Island, Ill.

[73] Assignee: Deere & Company, Moline, Ill.

[21] Appl. No.: 840,536

[22] Filed: Mar. 17, 1986

Related U.S. Application Data

[63] Continuation of Ser. No. 593,476, Mar. 26, 1984, abandoned.

[51] Int. Cl.$^4$ .............................................. A01C 7/14
[52] U.S. Cl. .................................... 221/211; 221/254; 222/342; 222/346; 222/349; 222/352; 111/6; 111/77
[58] Field of Search ................ 209/684; 221/162, 265, 221/211, 278, 254, 260, 257; 222/346, 352, 349–350, 342; 111/6–7, 34, 77

[56] References Cited

U.S. PATENT DOCUMENTS

| | | | |
|---|---|---|---|
| 691,877 | 1/1902 | Scott | 209/684 |
| 740,801 | 10/1903 | Brough | 222/352 X |
| 835,040 | 11/1906 | Snyder | 222/346 X |
| 977,115 | 11/1910 | Markley | 222/352 X |
| 1,839,697 | 1/1932 | Norris | 222/350 |
| 2,855,128 | 10/1958 | Cookson et al. | 222/352 |
| 2,921,717 | 1/1960 | Borak | 222/101 |
| 3,608,787 | 9/1971 | Grataloup | 222/342 |
| 3,637,108 | 1/1972 | Loesch et al. | 221/211 |
| 3,888,387 | 6/1975 | Deckler | 221/278 |
| 3,951,306 | 4/1976 | Ernst | 111/77 X |
| 4,047,638 | 9/1977 | Harrer | 221/266 |
| 4,074,830 | 2/1978 | Adams | 221/266 |
| 4,162,744 | 7/1979 | Barker et al. | 221/251 |
| 4,205,743 | 6/1980 | Whitmore | 221/162 X |

FOREIGN PATENT DOCUMENTS

| | | | |
|---|---|---|---|
| 89237 | 9/1960 | Denmark | 111/34 |
| 1051047 | 2/1959 | Fed. Rep. of Germany . | |
| 2011462 | 9/1971 | Fed. Rep. of Germany | 221/211 |
| 447950 | 3/1949 | Italy | 111/77 |
| 677842 | 8/1950 | United Kingdom . | |

Primary Examiner—Charles A. Marmor

[57] ABSTRACT

In a seed meter in which individual seeds from a seed mass within a first chamber on a first side of a seed disk rotatably mounted within a housing are transported by at least one circumferential row of apertures within the seed disk to a separate seed discharge area within the first chamber by the reduced pressure of a vacuum source coupled to a second chamber within the housing and on the opposite side of the seed disk from the first chamber, a brush and wiper arrangement mounted within a third chamber within and sealed from the second chamber and located opposite the seed discharge area bears against the second side of the seed disk to aid in dislodging and expelling debris from the apertures in the seed disk. The brush and wiper arrangement includes at least one circular brush rotatably mounted within the third chamber and a spring arrangement for biasing the circular brush and an adjacent circular band against the second surface of the seed disk at the at least one row of apertures. Also included is a relatively thin, generally planar wiper blade having a straight edge disposed against the second side of the seed disk and a leaf spring mounting the wiper blade and operative to bias the wiper blade against the second side of the seed disk at the at least one row of apertures.

11 Claims, 4 Drawing Sheets

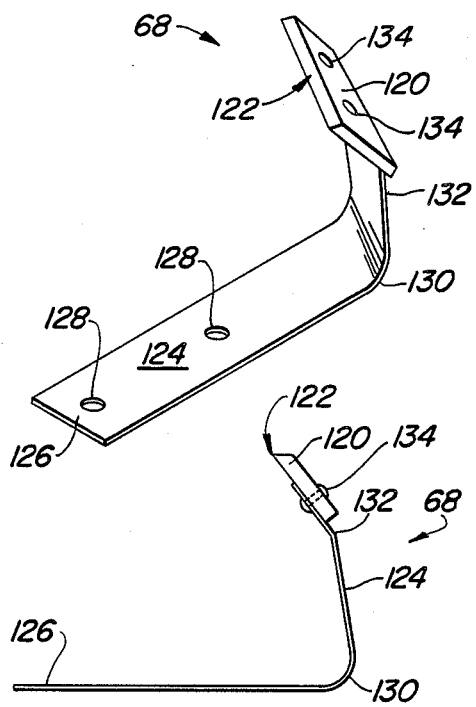
Fig. 7
Fig. 8
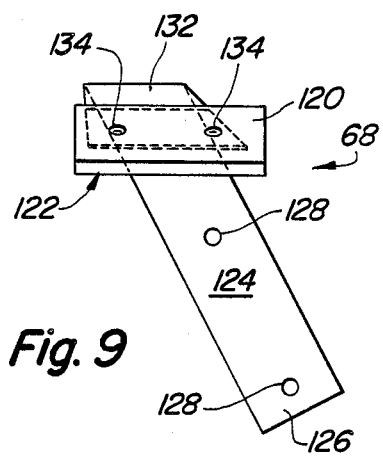
Fig. 9
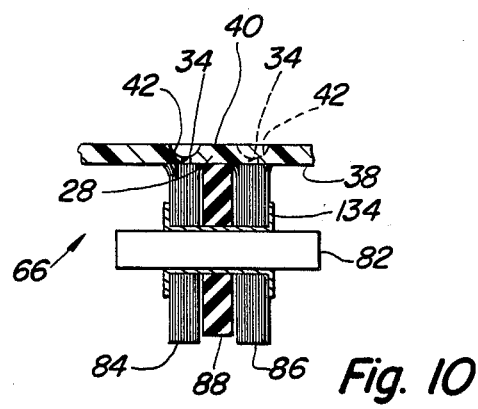
Fig. 10
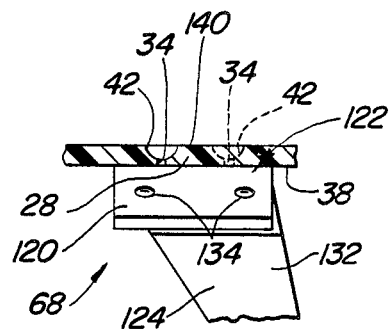
Fig. 11

SEED METER HAVING SEED DISK APERTURE CLEANING WIPER AND BRUSH ARRANGEMENT

This is a continuation of co-pending application Ser. No. 593,476, filed on Mar. 26, 1984, now abandoned.

BACKGROUND OF THE INVENTION

1. Field of the Invention

The present invention relates to seed meters for metering individual seeds at a controlled rate into a seed furrow, and more particularly to an arrangement for dislodging and removing seeds, seed particles, dirt and other debris which may become stuck or accumulate within apertures in a rotatable seed disk in a seed meter.

2. History of the Prior Art

Seed meters of various designs have been employed to dispense seeds at a controlled rate into a seed furrow as the seed meter is advanced along the furrow. In a typical arrangement a tractor is coupled to tow a tool bar to which are attached in generally parallel, spaced-apart relation a plurality of planting units with seed meter arrangements attached thereto. Each of the planting units includes a seed hopper for containing a quantity of the seed to be planted, a device for opening a furrow as the tractor drawn tool bar is advanced over the ground, a seed meter coupled to the seed hopper for metering or dispensing individual seeds into the furrow at a controlled rate and a further device for moving soil at the sides of the furrow to close the furrow over the seeds. The planting unit may further include containers for insecticide and fertilizer together with apparatus for dispensing controlled amounts of each.

Some seed meters are of the mechanical type in which mechanically actuated fingers or similar mechanical devices are typically used to separate individual seeds from a seed mass and then dispense them into a furrow. Other seed meters which are of the air type use an air pressure differential to pick up and then discharge individual seeds from a seed mass in controlled fashion. Typically, a rotating seed disk having one or more circumferential rows of apertures therein is used to pick up and then discharge the individual seeds.

Air seed meters may be of the positive pressure type in which air is blown into a seed chamber and onto the surface of the rotating seed disk or other movable member to create a higher than atmospheric pressure in the chamber. This forces seeds from a seed mass onto the seed disk where they are retained in the apertures for later release. The seeds are held against the apertures by the blowing air until they are released by interrupting the flow of air to the seeds. Examples of such air seed meters are provided by U.S. Pat. No. 3,888,387 of Deckler, No. 4,047,638 of Harrer and No. 4,074,830 of Adams.

Air seed meters may also be of the vacuum type in which a vacuum source is typically coupled to a separate chamber on the opposite side of the seed disk from the seed mass. The vacuum communicates through apertures in the seed disk to the seed mass to hold the seeds in place against the apertures as they are picked up from the seed mass and moved to the seed discharge area. An example of a vacuum seed meter is provided by U.S. Pat. No. 3,608,787 of Grataloup.

A further example of a vacuum seed meter which has particular advantages over seed meters of the prior art is provided by a co-pending application of William R. Lundie et al, Ser. No. 546,834, filed Oct. 31, 1983 and commonly assigned with the present application. The Lundie et al application describes a vacuum seed meter in which a seed disk is rotatably mounted within a housing so as to divide the interior of the housing into a first chamber adjacent a first side of the seed disk and an opposite second chamber at the opposite or second side of the seed disk. The seed disk is provided with one or more circumferential rows of apertures which extend through the thickness of the seed disk from the second side of the disk and terminate at the bottoms of recesses in the first side of the disk which define seed cells. The seed cells act to agitate, accelerate and then capture therein individual seeds from a seed mass within the first chamber. The individual seeds are held within the seed cells by a vacuum source coupled to the second chamber as the seeds are transported from the seed mass to a separate seed discharge area within the first chamber. At the seed discharge area the vacuum source is cut off from the apertures in the seed disk, allowing the individual seeds to fall out of the seed cells and through a chute to the ground below. The vacuum seed meter is usable with various different types of seeds, simply by changing the seed disk. Different seed disks have different sized apertures and different sizes and configurations of the connecting seed cells depending on the particular seed or type of seed to be metered by the seed meter.

In seed meters of the type described in previously referred to co-pending application Ser. No. 546,834 of Lundie et al as well as in other types of seed meters employing a rotatable, apertured seed disk, it sometimes happens that one or more of the apertures become clogged with seeds, seed particles, dirt or other debris. Such problems may occur, for example, where a seed being carried by one of the apertures in the seed disk between the seed mass and the seed discharge area somehow becomes stuck in the aperture. While the aperture diameter is typically chosen to be considerably smaller than the average size of seeds that the disk is designed for use with, unusually small seeds of that type or more often broken seeds or seed particles may become lodged within the apertures. It also sometimes happens that dirt or other debris may build up within the apertures. Sometimes this happens quickly, while at other times it occurs gradually over a period of time. A partial or complete clogging of one or more of the seed disk apertures by a seed, seed particles, dirt or other debris typically results in the aperture which is so clogged being thereafter unable to pick up and discharge a seed therefrom. This is harmful at the very best, and may render use of the seed meter unacceptable for certain applications, particularly if very many of the apertures should become clogged and therefore inoperative.

Ideally, therefore, the seed disk apertures should be kept free of unwanted matter such as seed particles, dirt and other debris. This should be done frequently, and preferably with each revolution of the seed disk so that each aperture therein can be prepared following each release of a seed therefrom to once again pick up a seed from the seed mass and release it in the seed discharge area.

Accordingly, it would be desirable to provide an improved seed meter having an arrangement for removing debris from apertures in a rotating seed disk therein.

It would furthermore be desirable to provide a seed meter in which an arrangement is provided for dislodging or removing debris from the apertures in the seed disk virtually with each revolution of the seed disk.

It would still furthermore be desirable to provide a seed disk having an arrangement which is effective in removing debris from the apertures in different seed disks designed for use with different seed types or sizes within the same seed meter.

BRIEF SUMMARY OF THE INVENTION

Seed meters in accordance with the invention employ a stationary seed disk aperture cleaning arrangement which bears against the surface of a rotating seed disk in the path or one or more rows of apertures in the disk so as to dislodge and remove debris from the apertures. The seed disk aperture cleaning arrangement is preferably located so as to remove debris from the apertures at a location at or immediately following the area where seed carried by the apertures are released therefrom. The disk aperture cleaning arrangement does not interfere with the operation of the seed meter in any significant respect, and can be designed so as to be effective for use with different seed disks used for different seed sizes or types.

In one example of a seed disk aperture cleaning arrangement in accordance with the invention, such arrangement comprises a wiper, a circular brush or both. Wipers have been found to be especially useful for use with seeds of typically relatively large size, where the resulting seed chips or particles are relatively large. In addition, wipers have been found to be effective in dislodging debris of various sizes in the disk apertures. Circular brushes are especially helpful when used with seeds of relatively small size where the apertures are of smaller diameter and the seed particles or chips which tend to clog such apertures are typically of smaller size. The circular brushes are also useful in general to remove debris from disk apertures of various sizes, particularly where a wiper is employed to initially dislodge the debris within the apertures.

In one preferred embodiment of a wiper and circular brush arrangement in accordance with the invention, the wiper has a relatively thin, generally planar wiper blade having a relatively straight edge disposed in contact with the surface of the seed disk at one or more circumferential rows of apertures therein. The straight edge is disposed so as to be radially oriented relative to the disk with the wiper blade itself forming an acute angle with the disk surface. The wiper blade is biased against the surface of the disk to maintain the wiper blade in floating contact with the disk surface. This may be accomplished by a leaf spring having a first end mounted in the inside of the housing of the seed meter and an opposite second end mounting the wiper blade.

The wiper and circular brush arrangement includes a circular brush which is mounted on a shaft. The shaft is rotatably contained within a housing mounted on the inside of the housing of the seed meter. The circular brush which is biased into contact with the surface of the seed disk by springs or similar devices has a circular band mounted in conjunction therewith. The circular band which is relatively rigid and yet has a high surface coefficient of friction engages the surface of and rotates with the seed disk as the seed disk rotates. The diameter of the circular band is smaller than the diameter of the circular brush by an amount which determines the extent to which the outer tips of the bristles comprising the circular brush are deflected and extend into the disk apertures.

BRIEF DESCRIPTION OF THE DRAWINGS

The foregoing and other objects, features and advantages of the invention will be apparent from the following more particular description of a preferred embodiment of the invention, as illustrated in the accompanying drawing, in which:

FIG. 7 is a perspective view of a wiper portion of the arrangement of FIG. 3;

FIG. 8 is a side view of the wiper portion of the arrangement of FIG. 3;

FIG. 9 is a top view of the wiper portion of the arrangement of FIG. 3;

FIG. 10 is a sectional view of a part of the brush portion of the arrangement of FIG. 3 in conjunction with a portion of the seed disk illustrating the manner in which debris within the disk apertures is removed by the brush portion; and FIG. 11 is a sectional view showing a part of the wiper portion of the arrangement of FIG. 3 in conjunction with a portion of the seed disk illustrating the manner in which debris within the disk apertures is removed by the wiper portion.

DETAILED DESCRIPTION

Figure 1:
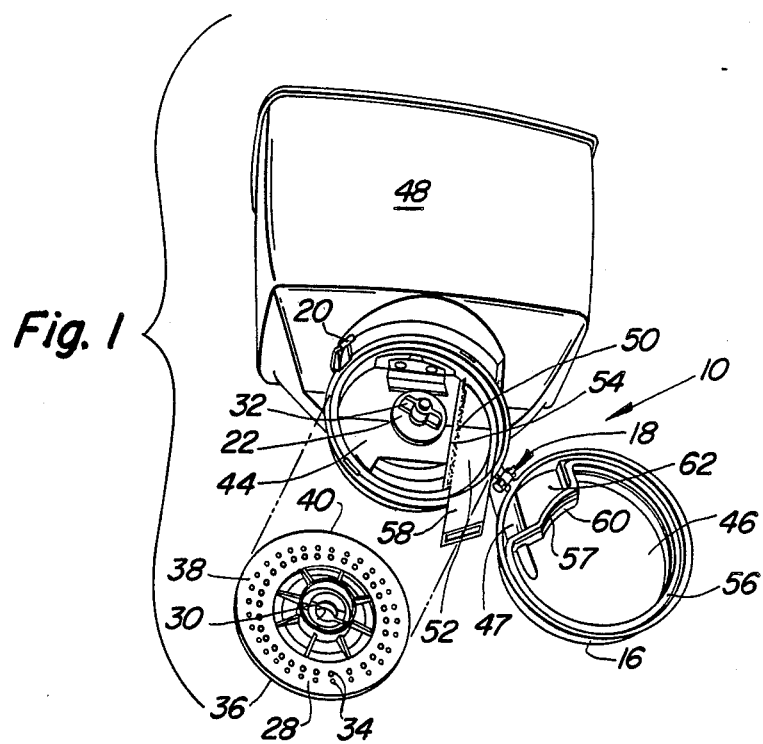
FIG. 1 is a perspective view of a seed meter with which a seed disk aperture cleaning wiper and brush arrangement in accordance with the invention may be used, the seed meter being mounted on a seed hopper and being shown in an open position together with a seed disk.

FIG. 1 illustrates a vacuum seed meter 10 which is shown and described in greater detail in the previously referred to co-pending application Ser. No. 546,834 of Lundie et al. The vacuum seed meter 10 has a generally cylindrical housing 12 comprised of a first half shell 14 and an opposite, mating second half shell 16. The second half shell 16 is coupled to the first half shell 14 by a hinge 18 permitting the second half shell 16 to be closed over the first half shell 14 to close the housing 12. A clasp 20 mounted on the first half shell 14 on a side thereof opposite the hinge 18 is secured to the second half shell 16 to hold the housing 12 in the closed position.

A hub 22 is rotatably mounted within the first half shell 14 of the housing 12 is at the center of the first half shell 14. The hub 22 is coupled to a pair of lugs (not shown) at the outside of the seed meter 10 which are engaged to rotatably drive the hub 22.

The seed meter 10 includes a seed disk 28 which has an elongated aperture 30 at the center thereof. The seed disk 28 is mounted for rotation on the hub 22 by passing a handle 32 which is mounted on the hub 22 through the elongated aperture 30 to seat the seed disk 28 on the hub 22. The handle 32 is then rotated into a position to lock the seed disk 28 on the hub 22.

The seed disk 28 has a plurality of apertures 34 therein arranged in a pair of concentric circumferential rows adjacent and inside of a circular outer edge 36 of the seed disk 28. Each of the apertures 34 extends through the thickness of the seed disk 28 between a second side 38 of the seed disk 28 and an opposite first side 40 (shown in FIGS. 10 and 11) of the seed disk 28. As shown in FIGS. 10 and 11 the seed disk 28 has a recess in the first side 40 thereof at each aperture 34 which forms a seed cell 42.

With the seed disk 28 mounted on the hub 22 and the second half shell 16 closed over the first half shell 14, the seed disk 28 divides the hollow interior of the cylindrical housing 12 into a first or seed chamber 44 between the seed disk 28 and the first half shell 14 and a second or vacuum chamber 46 between the seed disk 28 and the second half shell 16. A vacuum source is coupled via a vacuum port 47 in the second half shell 16 to create a vacuum within the vacuum chamber 46 adjacent the second side 38 of the seed disk 28. The vacuum communicates with the first side 40 of the seed disk 28 via the apertures 34.

As shown in FIG. 1 the first half shell 14 of the cylindrical housing 12 is mounted at the base of a seed hopper 48 for containing seeds to be metered by the vacuum seed meter 10. Seeds from the seed hopper 48 flow into the seed chamber 44 within the first half shell 14 where they form a seed mass against the first side 40 of the seed disk 28. As the hub 22 is rotatably driven so as to rotate the seed disk 28, the seed cells 42 formed at the ends of the apertures 34 on the first side 40 of the seed disk 28 agitate, accelerate and then capture individual seeds therein as they move through the seed mass within the seed chamber 44. As each seed cell 42 rises out of the seed mass, the seed contained therein is held in place by the vacuum within the vacuum chamber 46 which communicates with the seed via the aperture 34. The vacuum holds the seed in place in the seed cell 42 until the seed cell 42 passes across a divider brush 50. The divider brush 50 extends across the interior of the first half shell 14 and defines a seed discharge area 52 which is separated from the seed chamber 14 and the seed mass contained therein by the divider brush 50 and a divider wall 54 on which the brush 50 is mounted. As each aperture 34 enters the seed discharge area 52, the effects of the vacuum thereon from within the vacuum chamber 46 are cut off. This is due to the shape of a vacuum seal 56 which is mounted on the inside of the second half shell 16 and which extends into contact with the second side 38 of the seed disk 28. A portion 57 of the vacuum seal 56 extends inwardly from the region adjacent the circumference of the second half shell 16 to isolate the opposite seed discharge area 52 from the vacuum. As the vacuum is cut off from each aperture 34, the individual seed contained within the adjoining seed cell 42 falls out of the seed cell 42 under the influence of gravity. The seed falls through a seed discharge chute 58 at the bottom of the first half shell 14 to the ground below.

The portion 57 of the vacuum seal 56 which extends inwardly from the outer circumference of the second half shell 16 within a portion of the second or vacuum chamber 46 opposite the seed discharge area 52 combines with a wall 60 on which it is mounted to define a third chamber 62 which is within and yet sealed from the second or vacuum chamber 46. As described hereinafter in connection with FIG. 2 the third chamber 62 may be used to contain a seed disk aperture cleaning wiper and brush arrangement according to the invention.

Figure 2:
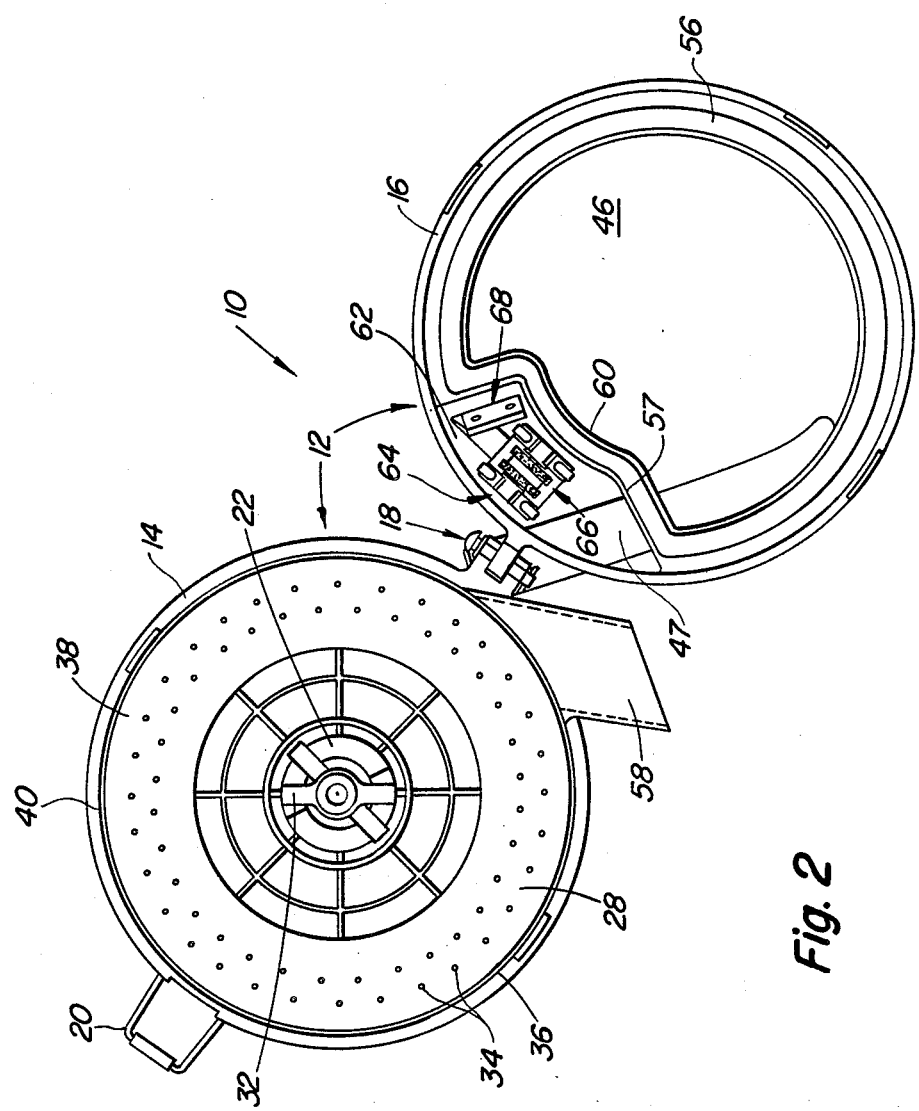
FIG. 2 is a perspective view of the seed meter of FIG. 1 with the seed disk installed in its operative position and showing the presence of a seed disk aperture cleaning wiper and brush arrangement according to the invention.

Turning to FIG. 2, the vacuum seed meter 10 is shown without the seed hopper 48. While the seed meter 10 is shown in the open position as in the case of FIG. 1, the seed disk 28 is shown in its mounted position on the hub 22 within the first half shell 14. In addition a seed disk aperture cleaning wiper and brush arrangement 64 in accordance with the invention is located within the third chamber 62 in the second half shell 16. The disk aperture cleaning wiper and brush arrangement 64 includes a brush assembly 66 and a wiper assembly 68.

The seed disk 28 is shown as having two circumferential rows of the apertures 34 in FIGS. 1 and 2. However, the seed disk 28 can be provided with one or any number of circumferential rows of the apertures 34 other than two depending upon the type of seeds being metered and the rates at which such seeds are to be metered. Two or more circumferential rows of the apertures 34 may be preferred to a single circumferential row where the desired metering rates are relatively high. In other respects, however, the double row aperture arrangement of FIGS. 1 and 2 operates in the same fashion as a single row arrangement or one having three or more rows of the apertures 34.

As previously noted in connection with FIG. 1 the seed cells 42 formed at the first side 40 of the seed disk 28 at the apertures (shown in FIGS. 10 and 11) 34 are operative to agitate, accelerate and then capture therein individual seeds from the seed mass which forms within the seed chamber 44 as the seed disk 28 rotates and the vacuum is applied to the second side 38 of the seed disk 28. As each of the apertures 34 enters the seed discharge area 52 where the effects of the vacuum thereon are cut off, the seed falls out of the adjoining seed cell 42 and down through the seed discharge chute 58 to the ground below.

As the seed disk 28 continues to rotate through the seed mass within the seed chamber 44, dirt or other debris may begin to build up within the apertures 34. Occasionally a very small seed or broken portion of a seed within the seed mass may become lodged or stuck within one of the apertures 34. Aside from that, small seed particles, dirt and other debris may become lodged within the apertures 34 so as to build up and eventually close off the apertures 34. The presence of debris within the apertures 34 may prevent the vacuum source from effectively communicating with the adjacent seed cells 42 at the first side 40 of the seed disk 28, thereby interfering with the proper pickup of a seed from the seed mass and delivery of that seed to the seed discharge area 52 with each rotation of the seed disk 28. Such omission can also occur if the buildup of debris within the apertures 34 becomes so voluminous that a seed cannot properly seat within the adjoining seed cells 42 as the seed is picked up from the seed mass. The omission of seeds in the otherwise orderly metering of seeds from the seed meter 10 is undesirable at the very least and may render the seed meter 10 unusable for certain applications.

Accordingly, it is desirable to provide an arrangement for keeping the apertures 34 free of seeds, seed particles, dirt and other debris. Such action is provided by the disk aperture cleaning wiper and brush arrangement 64. The arrangement 64 is located just downstream of the area within the seed discharge area 52 where the seeds are released from the disk 28 so as not to interfere with the metering of the seeds. At the same time the dislodging and expulsion of debris from the apertures 34 as provided by the arrangement 64 occurs within the seed discharge chute 58 so that debris expelled from the apertures 34 falls down the seed discharge chute 58 to the outside of the seed meter 10. In this manner the debris is kept from the inside of the seed meter 10 where it could build up and eventually again clog the apertures 34. As previously noted the third chamber 62 in which the disk aperture cleaning wiper and brush arrangement 64 is located is sealed from the vacuum chamber 46 and is therefore isolated from the vacuum source. This encourages the expulsion of debris from the apertures 34 through the seed cells 42 at the first side 40 of the seed disk 28 where the debris falls through the seed discharge chute 58 as just described. Isolation of the arrangement 64 from the vacuum source also prevents the vacuum source from drawing discharged debris into the third chamber 64 where it could build up and eventually interfere with the arrangement 64 and possibly the vacuum seal 56.

Figure 3:
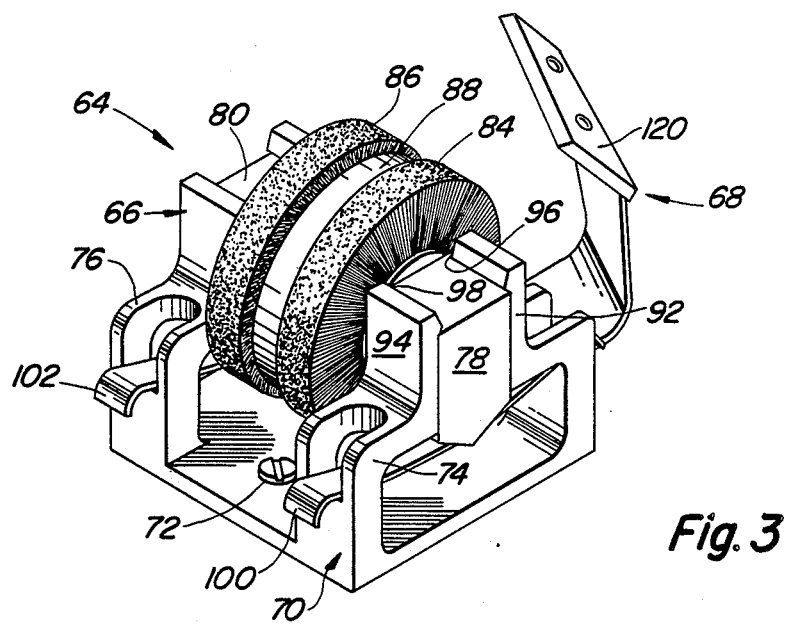
FIG. 3 is a perspective view of the seed disk aperture cleaning wiper and brush arrangement of FIG. 2.

The seed disk aperture cleaning wiper and brush arrangement 64 is shown in greater detail in FIG. 3. The brush assembly 66 includes a housing 70 which is mounted on the inside of the second half shell 16 within the third chamber 62 such as by a plurality of screws 72. The housing 70 has opposite, spaced-apart portions 74 and 76 thereof which respectively mount an opposite pair of brushings 78 and 80. Each of the bushings 78 and 80 is slidably mounted relative to the spaced-apart portions 74 and 76 respectively and rotatably receives one of the opposite ends of a shaft 82.

Figure 4:
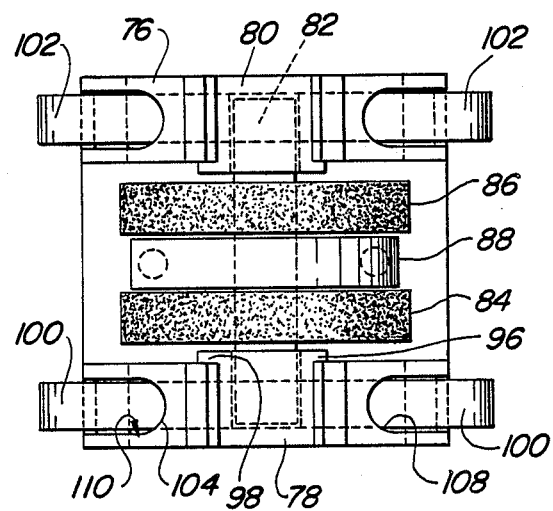
FIG. 4 is a front view of a brush portion of the arrangement of FIG. 3.
Figure 5:
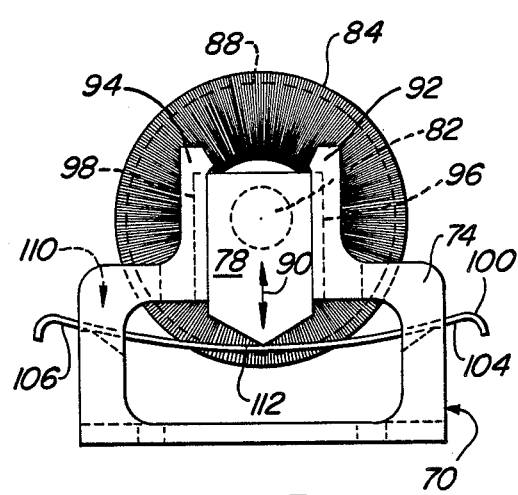
FIG. 5 is a side view of the brush portion of the arrangement of FIG. 3.
Figure 6:
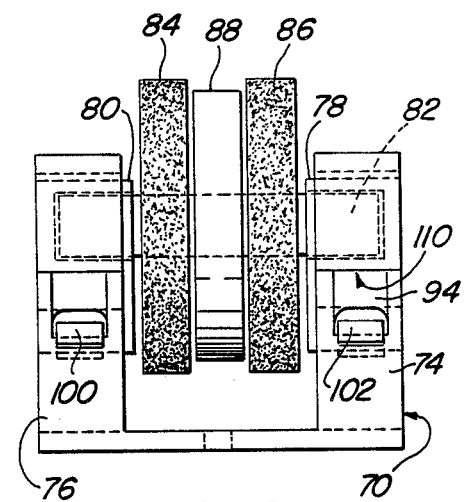
FIG. 6 is a top view of the brush portion of the arrangement of FIG. 3.

The shaft 82 which is shown in FIG. 4 and in dotted outline in FIGS. 5 and 6 mounts a pair of circular brushes 84 and 86 thereon. The brushes 84 and 86 are of generally like outer diameter and are separated from one another by a circular band 88 having an outer diameter slightly less than the outer diameters of the brushes 84 and 86.

As previously noted, each of the bushings 78 and 80 is slidably mounted relative to the spaced-apart portions 74 and 76 respectively of the housing 70. As denoted by an arrow 90 in FIG. 5, for example, the bushing 78 is slidable in a vertical direction relative to the adjacent portion 74 of the housing 70. The bushing 78 resides between and is slidable relative to opposite arms 92 and 94 formed within the portion 74 of the housng 70. As best seen in FIG. 6 the bushing 78 has opposite flanges 96 and 98 at the back thereof engaging the inside edges of the arms 92 and 94 to facilitate retention of the bushing 78 within the portion 74 of the housing 70 while at the same time permitting sliding movement thereof within the portion 74 of the housing 70. The opposite bushing 80 is slidably mounted within the portion 76 of the housing 70 in similar fashion.

The slidable mounting of the bushings 78 and 80 within the opposite portions 74 and 76 of the housing 70 permits movement of the shaft 82 and the included circular brushes 84 and 86 toward and away from the second side 38 of the seed disk 28. The circular brushes 84 and 86 and the intermediate circular band 88 are normally biased into contact with the second side 38 of the seed disk 28 by a pair of opposite leaf springs 100 and 102 mounted within the opposite portions 74 and 76 respectively of the housing 70. As seen in FIG. 5 the leaf spring 100 has opposite ends 104 and 106 thereof supported within apertures 108 and 110 respectively within the portion 74 of the housing 70 and an intermediate portion 112 thereof disposed under and in contact with the bushing 78. The leaf spring 100 tends to assume a relatively straight position in which the bushing 78 is forced upwardly. The opposite leaf spring 102 forces the other bushing 80 upwardly in similar fashion. The leaf springs 102 and 104 therefore resiliently bias the circular brushes 84 and 86 and the intermediate circular band 88 into contact with the second side 38 of the seed disk 28. Accordingly, the brushes 84 and 86 and the band 88 float as provided by the sliding action of the bushings 78 and 80 under the resilient urging of the leaf springs 100 and 102 so as to remain in contact with the second side 38 of the seed disk 28.

The wiper assembly 68 of FIG. 3 is shown in detail in FIGS. 7-9. As shown therein the wiper assembly 68 includes a relatively thin, generally planar wiper blade 120 having a relatively straight edge 122 extending along a side thereof and adapted to bear against the second side 38 of the seed disk 28 in the region of the circumferential rows of apertures 34 as described hereafter. The wiper blade 120 is resiliently biased against the second side 38 of the seed disk 28 by a leaf spring 124 having a first end 126 thereof adapted for mounting on the second half shell 16 of the cylindrical housing 12 within the third chamber 62 and beneath the housing 70 of the brush assembly 66. The first end 126 of the leaf spring 124 is provided with apertures 128 for receiving the screws 72 which also extend through the housing 70 of the brush assembly 66 as previously described.

The leaf spring 124 extends through a bend 130 of approximately 90° at an intermediate portion thereof to an opposite second end 132 which mounts the wiper blade 120 thereon. The leaf spring 124 is also bent slightly at the second end 132 just below the wiper blade 120 so as to dispose the wiper blade 120 at an acute angle of approximately 60° relative to the second side 38 of the seed disk 28. The wiper blade 120 is secured to the second end 132 of the leaf spring 124 such as by rivets 134.

The first end 126 of the leaf spring 124 is of generally uniform width up to the bend 130. Above the bend 130 the leaf spring 124 increases in width in a direction between the bend 130 and the second end 132, and at the same time angles off to the side because of the direction of the bend 130. This allows the wiper assembly 68 to reside within and assume the proper orientation within the confined space adjacent the brush assembly 66 within the third chamber 62.

The manner in which the brush assembly 66 interacts with the seed disk 28 is illustrated in FIG. 10. FIG. 10 shows the circular brushes 84 and 86, the circular band 88 and the seed disk 28 in section. As shown in FIG. 10 the circular brushes 84 and 86 and the circular band 88 are mounted on a hub 136 which in turn is secured to the outside of the shaft 82.

As previously described in connection with FIGS. 4-6, the opposite leaf springs 100 and 102 resiliently urge the opposite bushings 78 and 80 in an upward direction. This biases the shaft 82 upwardly so as to press the circular brushes 84 and 86 and the circular band 88 into contact with the second side 38 of the seed disk 28. The circular band 88 is made of a material such as polyurethane which is relatively hard and at the same time has a relatively high surface coefficient of friction. The circular brushes 84 and 86 on the other hand are comprised of elongated bristles and therefore are relatively flexible. Accordingly, the circular brushes 84 and 86 which have like outer diameters that are slightly larger than the diameter of the circular band 88 deflect against the second side 38 of the seed disk 28 by an amount necessary to permit the circular band 88 to reside against the second surface 38. In this manner the diameter of the circular band 88 determines the amount of deflection of the bristles of the circular brushes 84 and 86 against the second side 38 of the seed disk 28.

As the seed disk 28 rotates, the circular band 88 which is maintained in engagement with the second side 38 thereof by the leaf springs 100 and 102 rotates with the seed disk 28. This action causes the circular brushes 84 and 86 and the shaft 82 to also rotate. The circular brush 84 is aligned with the outer circumferential row of the apertures 34, while the circular brush 86 is aligned with the inner circumferential row of apertures 34. As the circular brushes 84 and 86 rotate against the second side 38 of the seed disk 28, the ends of the bristles comprising the brushes 84 and 86 deflect against the second side 38. However, each time one of the apertures 34 approaches and then passes over one of the circular brushes 84 and 86, the ends of the bristles poke into the aperture 34 to dislodge and expel debris which may stick or accumulate within the aperture 34. The bristles comprising the circular brushes 84 and 86 must be soft enough to allow deflection of the outer ends thereof against the second side 38 of the seed disk 28 and at the same time stiff enough so as to poke into the apertures 34 and dislodge and expel debris therefrom. The bristles of the circular brushes 84 and 86 extend into the apertures 34 in a direction to expel debris out through the seed cells 42 at the first side 40 of the seed disk 28. This insures that the debris will fall down the seed discharge chute 58 to the outside of the seed meter 10 as previously described.

As shown in FIG. 10 the shaft 82 which defines the axis of rotation for the circular brushes 84 and 86 and the circular band 88 is spaced-apart from and generally parallel to the seed disk 28. Also, to insure that the circular brushes 84 and 86 continue to roll along the circumferential rows of the apertures 34, the shaft 82 is generally radially disposed relative to the circular seed disk 28.

FIG. 11 illustrates the manner in which the wiper assembly 68 engages the second side 38 of the seed disk 28 along the two different circumferential rows of apertures 34. The leaf spring 124 not only mounts the wiper blade 120 but also biases the wiper blade 120 so that the straight edge 122 of the blade 120 is pressed against the second side 38 of the seed disk 28. This causes the straight edge 122 to scrape the second side 38 of the seed disk 28 along the two different circumferential rows of apertures 34 as the seed disk 28 rotates. As previously noted the wiper blade 120 forms an acute angle on the order of about 60° with the second side 38 of the seed disk 28. This angled positioning of the wiper blade 120 relative to the second side 38 allows the straight edge 122 of the wiper 120 to scrape the second side 38 of the seed disk 28 in relatively smooth fashion in the face of the biasing provided by the leaf spring 124 as the seed disk 28 rotates. The orientation of the wiper blade 120 is such that it points slightly downstream or in the direction of rotation of the seed disk 28. The wiper blade 120 and its included straight edge 122 are oriented generally radially relative to the circular seed disk 28.

As the wiper blade 120 moves across the second side 38 of the seed disk 28 with rotation of the seed disk 28, the straight edge 122 of the wiper blade 120 scrapes across the apertures 34 in the two different circumferential rows of apertures. This acts to dislodge and expel any debris which may accumulate in the apertures 34. The debris is expelled through the seed cells 42 at the first side 40 of the seed disk 28. As previously described this causes the debris to fall through the seed discharge chute 58 to the outside of the seed meter 10.

Both the brush assembly 66 and the wiper assembly 68 are effective in dislodging and expelling debris from apertures 34 of varying size used with different types of seeds of varying size. The brush assembly 66 has been found to be somewhat more effective in expelling debris from relatively small apertures such as on the order of 3.0 millimeter diameter or less used with relatively small seeds such as sugar beet, sunflower and sorghum. Conversely, the wiper assembly 68 has been found to be somewhat more effective in dislodging and expelling debris from relatively large apertures 34 used with relatively large seeds. For this reason it may be adequate to use the brush assembly 66 alone where only relatively small seeds are to be metered, and to use the wiper assembly 68 alone where only relatively large seeds are to be metered. Because the seed meter 10 is designed to be used with a wide variety of different seed sizes just by changing the seed disk 28, it is preferable that both the brush assembly 66 and the wiper assembly 68 be present therein. Moreover, the combination of the brush assembly 66 and the wiper assembly 68 has been found to be advantageous in itself. The wiper assembly 68 which is placed upstream of the brush assembly 66 relative to the direction of the seed disk 28 acts to loosen or dislodge debris of various sizes within the apertures 34. The brush assembly 66 which follows immediately downstream of the wiper assembly 68 then pokes the bristles of the circular brushes 84 and 86 into the apertures 34 to expel the loosened or dislodged debris therefrom.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a seed meter in which a rotatable seed disk has at least one row of apertures extending through the seed disk from a side surface thereof, the row of apertures being arranged generally circumferentially about the seed disk and being operative to carry seeds from a seed mass to a seed discharge area, the improvement comprising a brush assembly disposed adjacent the side surface of the seed disk, the brush assembly including at least one rotatably mounted circular brush engaging the side surface of the seed disk at the row of apertures, the brush assembly including a circular band disposed adjacent and rotatble with the circular brush, the circuit band having an outer diameter smaller than an outer diameter of the circular brush and engaging the side surface of the seed disk.

2. The invention set forth in claim 1, wherein the brush assembly includes a rotatable shaft having the circular brush and the circular band mounted thereon, the shaft being spaced-apart from and generally parallel to the side surface of the seed disk and being disposed generally radially relative to the seed disk.

3. A seed meter comprising the combination of:
a housing having a hollow interior;

a seed disk rotatably mounted within the hollow interior of the housing, the seed disk having at least one row of apertures therein extending through the thickness of the seed disk between opposite first and second sides of the seed disk, the at least one row of apertures being arranged generally circumferentially about the seed disk, the seed disk dividing the hollow interior of the housing into a first chamber at the first side of the seek disk and a second chamber at the second side of the seed disk, said first side of the disk including recesses at the apertures defining seed cells for receiving seeds;

means for introducing seeds into the first chamber to provide a mass of seeds therein adjacent the first side of the seed disk and the recesses therein, wherein said apertures are smaller than the recesses to prevent seeds from passing through the apertures to the second chamber;

means defining a separate seed discharge area within the first chamber;

means for providing a pressure differential between the first chamber and the second chamber;

means defining a third chamber within the second chamber, the third chamber being generally sealed from the second chamber and being disposed on the opposite side of the seed disk from the seed discharge area; and an aperture cleaning arrangement disposed within the third chamber and bearing against the second side of the seed disk at the row of apertures, the aperture cleaning arrangement being operative to dislodge debris within the apertures and including a wiper blade and means for resiliently biasing the wiper blade against the second side of the seed disk at the row of apertures to move the debris toward the first side of the disk and into the seed discharge area.

4. The invention set forth in claim 3, wherein the wiper blade has a relatively straight edge engaging the second side of the seed disk and disposed generally radially relative to the seed disk and the means for resiliently biasing comprises a leaf spring rigidly mounted within the third chamber at a first end thereof and having the wiper blade mounted thereon at an opposite second end thereof.

5. The invention set forth in claim 4, further including a brush assembly disposed within the third chamber and having a housing mounted over the first end of the leaf spring, at least one circular brush rotatably mounted within the housing and engaging the second side of the seed disk, and means for resiliently biasing the circular brush against the second side of the seed disk.

6. A seed meter comprising the combination of:
a housing having a hollow interior;
a seed disk rotatably mounted within the hollow interior of the housing, the seed disk having at least one row of apertures therein extending through the thickness of the seed disk between opposite first and second sides of the seed disk, the at least one row of apertures being arranged generally circumferentially about the seed disk, the seed disk dividing the hollow interior of the housing into a first chamber at the first side of the seed disk and a second chamber at the second side of the seed disk;
means for introducing seeds into the first chamber to provide a mass of seeds therein adjacent the first side of the seed disk and the apertures therein;
means defining a separate seed discharge area within the first chamber;
means for providing a pressure differential between the first chamber and the second chamber;
means defining a third chamber within the second chamber, the third chamber being generally sealed from the second chamber and being disposed on the opposite side of the seed disk from the seed discharge area; and
an aperture cleaning arrangement disposed within the third chamber and bearing against the second side of the seed disk at the row of apertures, the aperture cleaning arrangement being operative to dislodge debris within the apertures, wherein the aperture cleaning arrangement includes a wiper blade engaging the second side of the seed disk at the row of apertures and at least one rotatably mounted circular brush engaging the second side of the seed disk at the row of apertures; and wherein the seed disk rotates in a given direction to carry seeds in the at least one row of apertures from the mass of seeds to the seed discharge area and the at least one rotatably mounted circular brush is positioned downstream of the wiper blade in relation to the given direction of the seed disk so that each aperture in the at least one row of apertures in the seed disk encounters first the wiper blade and then the at least rotatably mounted circular brush as the aperture passes by the seed discharge area and the opposite third chamber.

7. A seed meter comprising the combination of:
a housing having a hollow interior;
a seed disk rotatably mounted within the hollow interior of the housing, the seed disk having at least one row of apertures therein extending through the thickness of the seed disk between opposite first and second sides of the seed disk, the at least one row of apertures being arranged generally circumferentially about the seed disk, the seed disk dividing the hollow interior of the housing into a first chamber at the first side of the seed disk and a second chamber at the second side of the seed disk;
means for introducing seeds into the first chamber to provide a mass of seeds therein adjacent the first side of the seed disk and the apertures therein;
means defining a separate seed discharge area within the first chamber;
means for providing a pressure differential between the first chamber and the second chamber;
means defining a third chamber within the second chamber, the third chamber being generally sealed from the second chamber and being disposed on the opposite side of the seed disk from the seed discharge area;
an aperture cleaning arrangement disposed within the third chamber and bearing against the second side of the seed disk at the row of apertures, the aperture cleaning arrangement being operative to dislodge debris within the apertures; and
wherein the aperture cleaning arrangement includes at least one rotatably mounted circular brush engaging the second side of the seed disk at the row of apertures and a housing mounted within the third chamber, a shaft having the at least one circular brush mounted therein, an opposite pair of bushings slidably mounted within the housing and rotatably receiving opposite ends of the shaft, and means mounted within the housing for biasing the opposite pair of bushings and the included shaft and circular brush in a direction to engage the second side of the seed disk with the circular brush.

8. The invention set forth in claim 7, wherein the at least one circular brush comprises a pair of circular brushes mounted on the shaft between the opposite pair of bushings and a circular band mounted on the shaft between the pair of circular brushes, and the means mounted within the housing for biasing comprises a pair of leaf springs mounted on opposite sides of the housing and each engaging a different one of the opposite pair of bushings.

9. A seed meter comprising the combination of:
a rotatably mounted seed disk having at least one row of apertures therein extending through the thickness of the seed disk between opposite first and second sides of the seed disk, the at least one row of apertures being arranged generally circumferentially about the seed disk;
means for providing a mass of seeds generally of predetermined size at the first side of the seed disk and the apertures therein, said apertures being sufficiently small to prevent the seeds from passing from the first side to the second side of the disk;
means for providing a pressure differential between the opposite first and second sides of the seed disk;
means defining a seed discharge area at the first side of the seed disk, the seed discharge area being separated from the seed mass and being isolated from the pressure differential; and
an aperture cleaning arrangement disposed opposite the seed discharge area and bearing against the second side of the seed disk at the row of apertures, the aperture cleaning arrangement including a wiper blade having a scraping edge and means for biasing the wiper blade against the second side of the disk with the edge scraping across the apertures to dislodge debris within the apertures and expel the debris toward the first side of the disk.

10. The invention set forth in claim 9, further including a housing disposed adjacent the seed disk and having a hollow interior defining a chamber at the first side of the seed disk, the chamber including the mass of seeds and the seed discharge area.

11. A seed meter comprising the combination of:
a rotatably mounted seek disk having at least one row of apertures of generally like size therein extending through the thickness of the seed disk between opposite first and second sides of the seed disk, the at least one row of apertures being arranged generally circumferentially about the seed disk;
means for providing a mass of seeds at the first side of the seek disk and the apertures therein, the mass of seeds being comprised of seeds having a nominal size which is larger than the generally like size of the apertures in the seed disk;
a seed discharge area at the first side of the seed disk and separated from the mass of seeds, the at least one row of apertures in the seed disk being operative to carry seeds from the seed mass to the seed discharge area; and
a wiper assembly disposed adjacent the second side of the seek disk and including a wiper blade and means for resiliently biasing the wiper blade against the second side of the seek disk at the row of apertures, the wiper blade being operative to dislodge seeds and debris which become lodged in the apertures and to expel the lodged seeds and debris toward the first side of the disk.

12. The invention set forth in claim 11, wherein the wiper blade has a relatively straight side edge thereof engaging the second side of the seed disk and forming an acute angle with the second side of the seed disk.

13. The invention as set forth in claim 11, wherein the means for resiliently biasing comprises a leaf spring rigidly mounted on a reference member at a first end thereof and having the wiper blade mounted thereon at the opposite second end thereof.

* * * * *